United States Patent
Zhong

(10) Patent No.: US 10,949,687 B2
(45) Date of Patent: Mar. 16, 2021

(54) METHOD AND APPARATUS FOR OUTPUTTING INFORMATION

(71) Applicant: Baidu Online Network Technology (Beijing) Co., Ltd., Beijing (CN)

(72) Inventor: Zhaolai Zhong, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 78 days.

(21) Appl. No.: 16/130,779

(22) Filed: Sep. 13, 2018

(65) Prior Publication Data

US 2019/0197328 A1    Jun. 27, 2019

(30) Foreign Application Priority Data

Dec. 27, 2017   (CN) .......................... 201711447009.7

(51) Int. Cl.
  *G06K 9/00*    (2006.01)
  *G08G 1/017*   (2006.01)
  *G08G 1/04*    (2006.01)

(52) U.S. Cl.
  CPC ..... *G06K 9/00845* (2013.01); *G06K 9/00288* (2013.01); *G08G 1/0175* (2013.01); *G08G 1/04* (2013.01)

(58) Field of Classification Search
  USPC ....................................................... 382/104
  See application file for complete search history.

(56) References Cited

U.S. PATENT DOCUMENTS 7,710,452 B1 *  5/2010  Lindberg ............... H04N 7/188
                                              348/149

FOREIGN PATENT DOCUMENTS

| CN | 202276422 A | | 6/2012 |
| CN | 202276422 U | * | 6/2012 |
| CN | 106778682 A | * | 5/2017 |
| CN | 106778682 A | | 5/2017 |
| CN | 107256394 A | * | 10/2017 |
| CN | 107256394 A | | 10/2017 |

* cited by examiner

Primary Examiner — Wednel Cadeau
(74) Attorney, Agent, or Firm — Nixon Peabody LLP

(57) ABSTRACT

Embodiments of the present disclosure disclose a method and apparatus for outputting information. A specific embodiment of the method includes: acquiring a driving video of a driving process of a vehicle shot within a preset time period, the driving video including at least one frame of driving image; selecting, from the driving video, a driving image including a face image area of a driver; extracting a facial feature of the driver from the driving image including the face image area of the driver; determining identity information of the driver based on the facial feature of the driver; and outputting the identity information of the driver. This embodiment can quickly determine the identity information of the driver.

10 Claims, 4 Drawing Sheets

METHOD AND APPARATUS FOR OUTPUTTING INFORMATION

CROSS-REFERENCE TO RELATED APPLICATIONS

This application claims priority to Chinese Patent Application No. 201711447009.7, filed with the State Intellectual Property Office of the People's Republic of China (SIPO) on Dec. 27, 2017, the content of which is incorporated herein by reference in its entirety.

TECHNICAL FIELD

Embodiments of the present disclosure relate to the field of computer technology, specifically relate to the field of image recognition technology, and more specifically relate to a method and apparatus for outputting information.

BACKGROUND

With the rapid development of the economy, automobiles have become a basic transportation means for families. The popularity of automobiles has brought great convenience to people's travel, but at the same time led to the increasingly outstanding phenomenon of vehicle illegal driving. For example, traffic violations such as traffic light violation, converse driving, overspeed driving, cross-line driving, and illegal parking of vehicles frequently occur. Therefore, how to determine the identity of the driver driving the vehicle when a traffic violation occurs becomes critical.

SUMMARY

Embodiments of the present disclosure provide a method and apparatus for outputting information.

In a first aspect, the embodiments of the present disclosure provide a method for outputting information. The method includes: acquiring a driving video of a driving process of a vehicle shot within a preset time period, the driving video including at least one frame of driving image; selecting, from the driving video, a driving image including a face image area of a driver; extracting a facial feature of the driver from the driving image including the face image area of the driver; determining identity information of the driver based on the facial feature of the driver; and outputting the identity information of the driver.

In some embodiments, the extracting a facial feature of the driver from the driving image including the face image area of the driver, includes: generating an image matrix of the driving image including the face image area of the driver, wherein a row of the image matrix corresponds to a height of the face image, a column of the image matrix corresponds to a width of the face image, and an element of the image matrix corresponds to a pixel of the face image; and inputting the image matrix of the driving image including the face image area of the driver into a pre-trained convolutional neural network to obtain the facial feature of the driver, wherein the convolutional neural network is used to extract a facial feature.

In some embodiments, the determining identity information of the driver based on the facial feature of the driver, includes: selecting a driving image including a license plate number image area from the driving video; performing an image analysis on the driving image including the license plate number image area to obtain the license plate number of the vehicle; matching the facial feature of the driver and the license plate number of the vehicle in a pre-acquired vehicle-related information set, wherein vehicle-related information in the vehicle-related information set includes the license plate number of the vehicles, a face image of an owner of the vehicle, and identity information of the owner of the vehicle; and acquiring identity information of the driver in the successfully matched vehicle-related information as the identity information of the driver, if the matching is successful.

In some embodiments, the determining identity information of the driver based on the facial feature of the driver, includes: matching the facial feature of the driver in a pre-stored facial feature set, wherein a facial feature in the facial feature set corresponds to identity information; and acquiring identity information corresponding to the successfully matched facial feature as the identity information of the driver, if the matching is successful.

In some embodiments, the method further includes: analyzing the driving video to determine a driving type of the driver and a driving type of the vehicle; determining, based on the driving type of the driver and the driving type of the vehicle, a responsibility level of the driver in a traffic accident occurred within the preset time period; and outputting the responsibility level of the driver in the traffic accident occurred within the preset time period.

In a second aspect, the embodiments of the present disclosure provide an apparatus for outputting information. The apparatus includes: an acquisition unit, configured to acquire a driving video of a driving process of a vehicle shot within a preset time period, the driving video including at least one frame of driving image; a selection unit, configured to select, from the driving video, a driving image including a face image area of a driver; an extraction unit, configured to extract a facial feature of the driver from the driving image including the face image area of the driver; a first determination unit, configured to determine identity information of the driver based on the facial feature of the driver; and a first output unit, configured to output the identity information of the driver.

In some embodiments, the extraction unit includes: a generation subunit, configured to generate an image matrix of the driving image including the face image area of the driver, wherein a row of the image matrix corresponds to a height of the face image, a column of the image matrix corresponds to a width of the face image, and an element of the image matrix corresponds to a pixel of the face image; and an extraction subunit, configured to input the image matrix of the driving image including the face image area of the driver into a pre-trained convolutional neural network to obtain the facial feature of the driver, wherein the convolutional neural network is used to extract a facial feature.

In some embodiments, the first determination unit includes: a selection subunit, configured to select a driving image including a license plate number image area from the driving video; an analyzing subunit, configured to perform an image analysis on the driving image including the license plate number image area to obtain the license plate number of the vehicle; a first matching subunit, configured to match the facial feature of the driver and the license plate number of the vehicle in a pre-acquired vehicle-related information set, wherein vehicle-related information in the vehicle-related information set includes the license plate number of the vehicle, a face image of an owner of the vehicle, and identity information of the owner of the vehicle; and a first determination subunit, configured to acquire identity information of a driver in the successfully matched vehicle-related information as the identity information of the driver, if the matching is successful.

In some embodiments, the first determination unit includes: a second matching subunit, configured to match the facial feature of the driver in a pre-stored facial feature set, wherein a facial feature in the facial feature set corresponds to identity information; and a second determination subunit, configured to acquire identity information corresponding to the successfully matched facial feature as the identity information of the driver, if the matching is successful.

In some embodiments, the apparatus further includes: a second determination unit, configured to analyze the driving video to determine a driving type of the driver and a driving type of the vehicle; a third determination unit, configured to determine, based on the driving type of the driver and the driving type of the vehicle, a responsibility level of the driver in a traffic accident occurred within the preset time period; and a second output unit, configured to output the responsibility level of the driver in the traffic accident occurred within the preset time period.

In a third aspect, the embodiments of the present disclosure provide a device, including: one or more processors; and a storage apparatus, for storing one or more programs, the one or more programs, when executed by the one or more processors, cause the one or more processors to implement the method according to any embodiment in the first aspect.

In a fourth aspect, the embodiments of the present disclosure provide a computer readable storage medium, storing a computer program thereon, the computer program, when executed by a processor, implements the method according to any embodiment in the first aspect.

The method and apparatus for outputting information provided by the embodiments of the present disclosure first selects a driving image including a face image area of a driver from an acquired driving video of driving process of a vehicle shot within a preset time period, then extracts a facial feature of the driver from the driving image including the face image area of the driver, and finally determines identity information of the driver based on the facial feature of the driver and outputs the identity information of the driver. Therefore, the identity information of the driver can be quickly determined.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
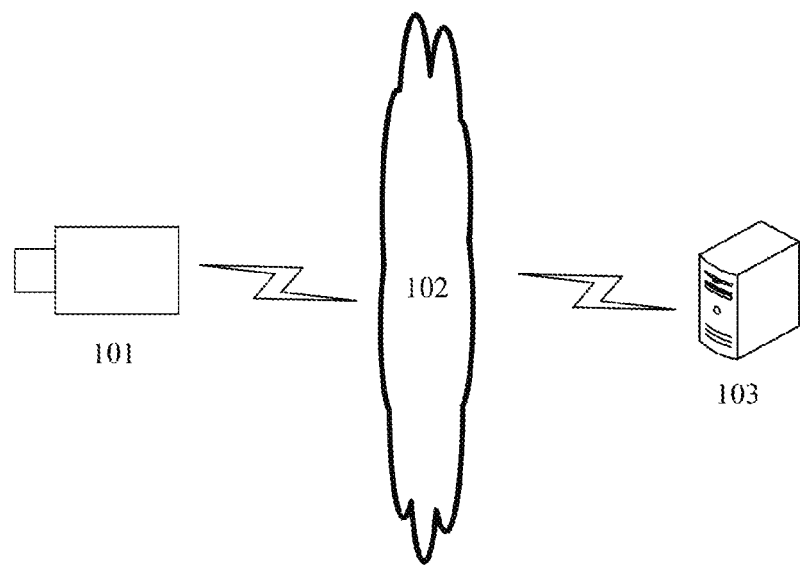
FIG. 1 is an exemplary system architecture diagram to which embodiments of the present disclosure may be applied.

FIG. 1 shows an exemplary architecture of a system 100 in which a method for generating a webpage or an apparatus for generating a webpage according to the embodiments of the present disclosure.

As shown in FIG. 1, the system architecture 100 may include a camera device 101, a network 102 and a server 103. The network 102 serves as a medium providing a communication link between the camera device 101 and the server 103. The network 102 may include various types of connections, such as wired or wireless transmission links, or optical fibers.

The camera device 101 may interact with the server 103 through the network 102, in order to transmit or receive messages, etc. The camera device 101 may be various electronic devices having a camera function including, but not limited to, camera device, video camera device, camera, etc.

The server 103 may provide various services, for example, the server 103 may analysis and process the driving video of a driving process of a vehicle shot within a preset time period acquired by the camera device 101, and output the processing result(for example the identity of the driver).

It should be noted that the information outputting method according to the embodiments of the present disclosure is generally executed by the server 103. Accordingly, an information outputting apparatus is generally installed on the server 103.

It should be appreciated that the numbers of the camera devices, the networks and the servers in FIG. 1 are merely illustrative. Any number of camera devices, networks and servers may be provided based on the actual requirements.

Figure 2:
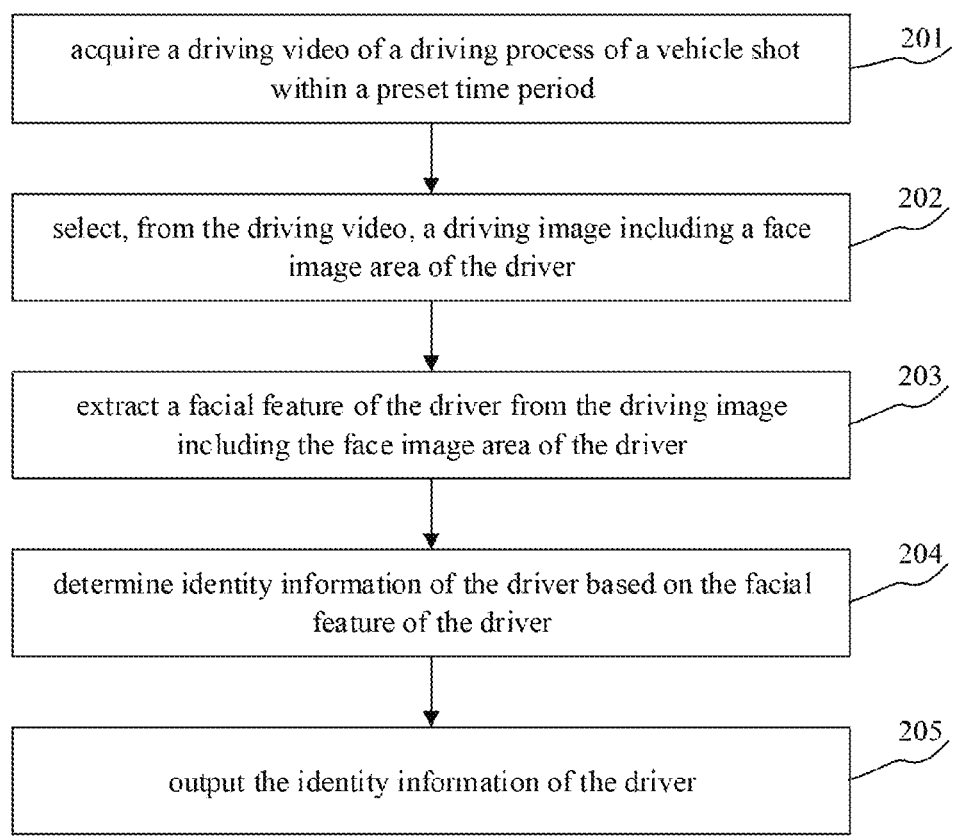
FIG. 2 is a flowchart of a method for outputting information according to an embodiment of the present disclosure.

With further reference to FIG. 2, a flow 200 of the method for outputting information according to an embodiment of the present disclosure is illustrated. The method for outputting information includes the following steps:

Step 201, acquiring a driving video of a driving process of a vehicle shot within a preset time period.

In the present embodiment, the electronic device (e.g., the server 103 as shown in FIG. 1) on which the method for outputting information operate may first acquire a driving video of a driving process of a vehicle shot within a preset time period through a wired connection or a wireless connection from a camera device (e.g., the camera device 101 as shown in FIG. 1). The camera device may be various electronic devices having a camera function, including but not limited to a video camera, a camera, and the like. For example, the camera device may be an electronic eye installed at a traffic intersection. The electronic eye may monitor all kinds of traffic violations around the clock through vehicle detection, photoelectric imaging, autocontrol, network communication, computer and other technologies to capture driving videos of vehicles. The preset time period may be any time period preset according to requirements. For example, within a certain period of time a vehicle is suspected of having illegal driving behavior, or within a certain period of time the vehicle has a traffic accident, the certain time period may be used as the preset time period. The driving video may include at least one frame of image, and at least some of the image of the at least one frame of image may include a face image area of the driver of the vehicle.

Step 202, selecting, from the driving video, a driving image including a face image area of a driver.

In the present embodiment, based on the driving video acquired in step 201, the electronic device may select a driving image including a face image area of the driver from the driving video. Typically, some of the at least one frame of image in the driving video will include a face image area of the driver of the vehicle, and some of the image will not include a face image area of the driver of the vehicle. The electronic device may perform a face detection on the at least one frame of image in the driving video, to detect a driving image including the face image area of the driver.

In practice, some of the driving images including the face image area of the driver may be covered, or may be blurred. To avoid affecting the facial feature extraction, the electronic device may select a relatively clear driving image including the face image area of the driver, or may perform a denoising processing on the driving image including the face image area of the driver to obtain a relatively clear driving image including the face image area of the driver.

Step 203, extracting a facial feature of the driver from the driving image including the face image area of the driver.

In the present embodiment, based on the driving image including a face image area of a driver selected in step 202, the electronic device may extract a facial feature of the driver from the driving image including the face image area of the driver. Here, the facial feature may be information describing the face feature of the driver, including but not limited to a color feature, a texture feature, a shape feature, a spatial relationship feature, and the like.

In some alternative implementations of the present embodiment, the electronic device may first detect a face image area of the driver in the driving image including the face image area of the driver, then perform an image analysis on the face image area of the driver using a mathematical model in combination with image processing technologies to extract at least one face feature of the driver as the facial feature of the driver. The face feature may include, but is not limited to, a face shape, a shape of facial features, a position and proportion of facial features, and the like.

In some alternative implementations of the present embodiment, the electronic device may first generate an image matrix of the driving image including the face image area of the driver, and then input the image matrix of the driving image including the face image area of the driver into a pre-trained convolutional neural network for extracting a facial feature to obtain the facial feature of the driver.

In practice, an image may be represented by a matrix. Specifically, the rows of the image matrix of the image may correspond to the height of the image, the columns of the image matrix of the image may correspond to the width of the image, and elements of the image matrix of the image may correspond to the pixels of the image. For example, in the case where the image is a grayscale image, the elements of the image matrix of the image may correspond to the grayscale values of the grayscale image; in the case where the image is a color image, the elements of the image matrix of the image correspond to the RGB (Red Green Blue) values of the color image. Typically, all colors that human vision can perceive are obtained through the variation or the superposition with each other of the three color channels of red, green, and blue.

Here, the convolutional neural network may be a feedforward neural network, and its artificial neurons may respond to some surrounding cells in the coverage and have excellent performance for large image processing. Typically, the basic structure of a convolutional neural network includes two layers, one of which is the feature extraction layer. The input of each neuron is connected to the local receptive field of the previous layer, and the local feature is extracted. Once the local feature is extracted, its positional relationship with other features is also determined. The other layer is the feature mapping layer, each computing layer of the network is composed of multiple feature mappings, and each of the feature mappings is a plane, all neurons in the plane have equal weights. Moreover, the input of the convolutional neural network is an image matrix of the driving image including the face image area of the driver, and the output of the convolutional neural network is the facial feature of the driver, so that the convolutional neural network may be used to extract a facial feature.

Here, the electronic device may first acquire an image matrix corresponding to a sample image and a facial feature corresponding to the sample image, then use the image matrix corresponding to the sample image as an input and the facial feature corresponding to the sample image as an output, and train to obtain a convolutional neural network capable of extracting a facial feature. Here, the face image area may be included in the sample image. The convolutional neural network trained by the electronic device may be an initial convolutional neural network. The initial convolutional neural network may be an untrained convolutional neural network or a training unfinished convolutional neural network. The layers of the initial convolutional neural network may be provided with initial parameters, the parameters may be continually adjusted during the training process until a convolutional neural network that can be used to extract a facial feature is obtained.

Step 204, determining identity information of the driver based on the facial feature of the driver.

In the present embodiment, based on the facial feature of the driver extracted in step 203, the electronic device may determine identity information of the driver. Here, the identity information of the driver may include, but is not limited to, the driver's name, ID number, license number, cell phone number, and the like.

In some alternative implementations of the present embodiment, the electronic device may determine the identity information of the driver by the following steps:

First, selecting a driving image including a license plate number image area from the driving video.

Typically, some of the image in the at least one frame of image in the driving video includes the license plate number image area of the vehicle, and some of the image does not include the license plate number image area of the vehicle. The electronic device may examine the at least one frame of image in the driving video and find a driving image including the license plate number image area of the vehicle. In practice, some of the driving images including the license plate number image area of the vehicle may be covered or may be blurred. In order to obtain a more accurate license plate number, the electronic device may select a relatively clear driving image including the license plate number of the vehicle, or may perform a denoising processing on the driving image including the license plate number of the vehicle to obtain a relatively clear driving image including the license plate number of the vehicle.

Then, performing an image analysis on the driving image including the license plate number image area to obtain the license plate number of the vehicle.

Specifically, the electronic device may perform an image recognition on the driving image including the license plate number image area to recognize the license plate number of the vehicle.

Then, matching the facial feature of the driver and the license plate number of the vehicle in a pre-acquired vehicle related information set.

Here, vehicle-related information in the vehicle-related information set may be pre-acquired from the vehicle management system, including the license plate number of the vehicle, a face image of the owner of the vehicle, and the identity information of the owner of the vehicle.

As an example, for each vehicle-related information in the vehicle-related information set, the electronic device may extract the facial feature of the owner of the vehicle from the face image of the owner of the vehicle in the vehicle-related information, and compare the facial feature of the owner of the vehicle with the facial feature of the driver, if the facial feature of the owner of the vehicle is the same or similar to the facial feature of the driver, the matching is successful.

As another example, for each vehicle-related information in the vehicle-related information set, the electronic device may compare the license plate number of the vehicle with the license plate number of the vehicle in the vehicle-related information, if the license plate number of the vehicle is the same as the license plate number of the vehicle in the vehicle related information, the matching is successful.

As still another example, for each vehicle-related information in the vehicle-related information set, the electronic device may extract the facial feature of the owner of the vehicle from the face image of the owner of the vehicle in the vehicle-related information, compare the facial feature of the owner of the vehicle with the facial feature of the driver, and compare the license plate number of the vehicle with the license plate number of the vehicle in the vehicle-related information, if the facial feature of the owner of the vehicle is the same or similar to the facial feature of the driver, and the license plate number of the vehicle is the same as the license plate number of the vehicle in the vehicle related information, the matching is successful.

Finally, acquiring identity information of the driver in the successfully matched vehicle-related information as the identity information of the driver, if the matching is successful.

In some alternative implementations of the present embodiment, the electronic device may match the facial feature of the driver in a pre-stored facial feature set, and if the matching is successful, acquire the identity information corresponding to the successfully matched facial feature as the identity information of the driver. Here, the electronic device may pre-collect identity information of some people and the face images of these people, and then extract the facial features of these people from the face images of the people, generate a facial feature set, while corresponds the facial features in the facial feature set to the identity information. Typically, the facial feature and the identity information are in one-to-one correspondence.

Step 205, outputting the identity information of the driver.

In the present embodiment, based on the identity information of the driver determined in step 204, the electronic device may output the identity information of the driver. Alternatively, the electronic device may output the identity information of the driver to the terminal device communicatively connected thereto, so that the identity information of the driver is displayed on the screen of the terminal device or the identity information of the driver is played by the audio playback device of the terminal device. The identity information of the driver may also be output to the memory of the electronic device for storage.

The method for outputting information provided by the embodiments of the present disclosure first selects a driving image including a face image area of a driver from an acquired driving video of a driving process of a vehicle shot within a preset time period, then extracts a facial feature of the driver from the driving image including the face image area of the driver, and finally determines identity information of the driver based on the facial feature of the driver and outputs the identity information of the driver. Therefore, the identity information of the driver can be quickly determined.

Figure 3:
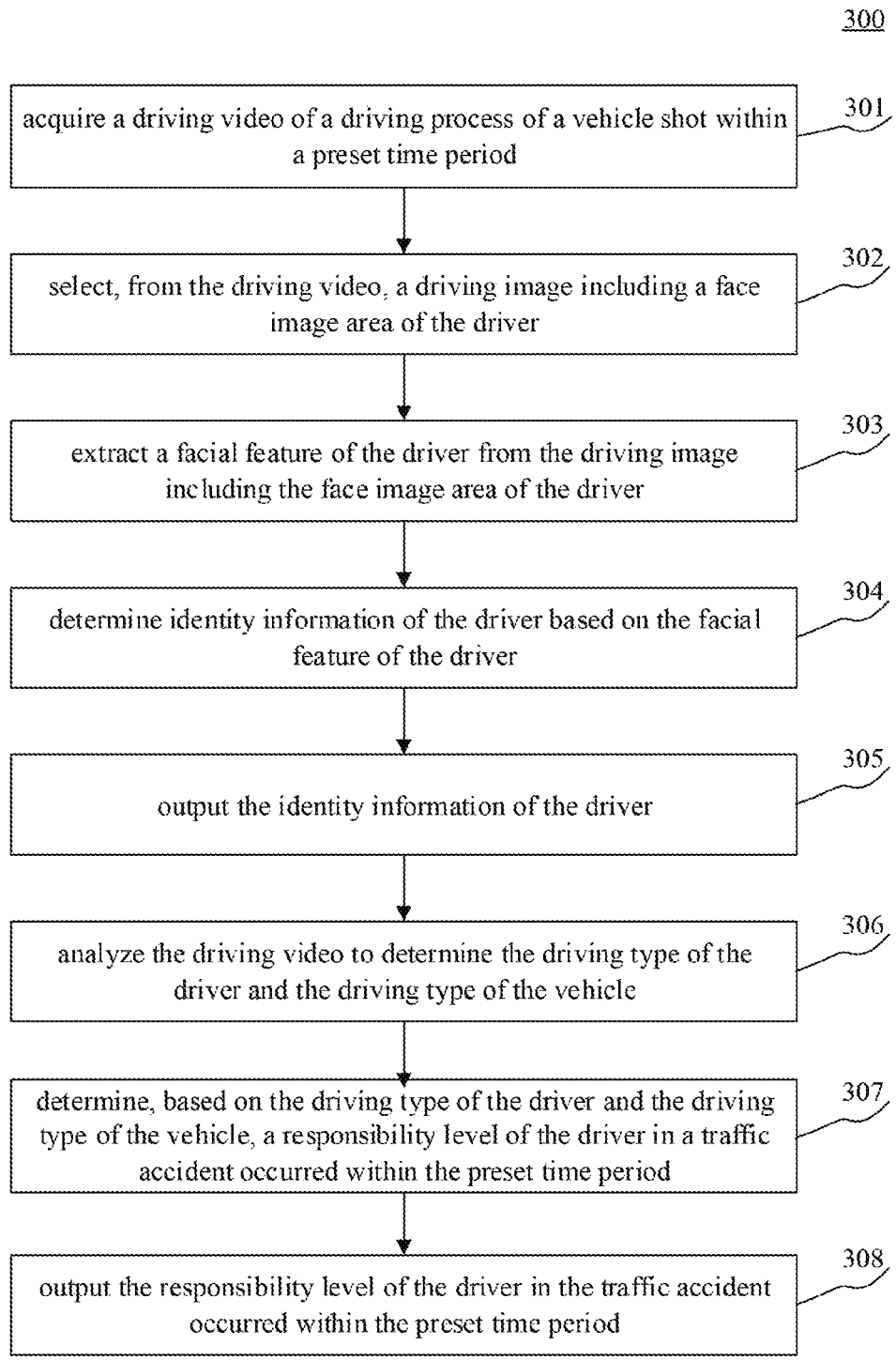
FIG. 3 is a flowchart of the method for outputting information according to another embodiment of the present disclosure.

With further reference to FIG. 3, a flow 300 of the method for outputting information according to another embodiment of the present disclosure is illustrated. The flow 300 of the method for outputting information includes the following steps:

Step 301, acquiring a driving video of a driving process of a vehicle shot within a preset time period.

In the present embodiment, the electronic device (e.g., the server 103 as shown in FIG. 1) on which the method for outputting information operate may acquire a driving video of a driving process of a vehicle within a preset time period through a wired connection or a wireless connection from a camera device (e.g., the camera device 101 as shown in FIG. 1). The camera device may be various electronic devices having a camera function, including but not limited to a video camera, a camera, and the like. The preset time period may be any time period preset according to requirements. The driving video may include at least one frame of image, and at least some of the image of the at least one frame of image may include a face image area of the driver of the vehicle.

Step 302, selecting, from the driving video, a driving image including a face image area of a driver.

In the present embodiment, based on the driving video acquired in step 301, the electronic device may select a driving image including a face image area of the driver from the driving video. Typically, some of the at least one frame of image in the driving video will include a face image area of the driver of the vehicle, and some of the image will not include a face image area of the driver of the vehicle. The electronic device may perform a face detection on the at least one frame of image in the driving video, to detect a driving image including the face image area of the driver.

Step 303, extracting a facial feature of the driver from the driving image including the face image area of the driver.

In the present embodiment, based on the driving image including a face image area of a driver selected in step 302, the electronic device may extract a facial feature of the driver from the driving image including the face image area of the driver. Here, the facial feature may be information describing the face feature of the driver, including but not limited to a color feature, a texture feature, a shape feature, a spatial relationship feature, and the like.

Step 304, determining identity information of the driver based on the facial feature of the driver.

In the present embodiment, based on the facial feature of the driver extracted in step 303, the electronic device may determine identity information of the driver. Here, the identity information of the driver may include, but is not limited to, the driver's name, ID number, license number, cell phone number, and the like.

Step 305, outputting the identity information of the driver.

In the present embodiment, based on the identity information of the driver determined in step 304, the electronic device may output the identity information of the driver. Alternatively, the electronic device may output the identity information of the driver to the terminal device communicatively connected thereto, so that the identity information of the driver is displayed on the screen of the terminal device or the identity information of the driver is played by the audio playback device of the terminal device. The identity information of the driver may also be output to the memory of the electronic device for storage.

Step 306, analyzing the driving video to determine a driving type of the driver and a driving type of the vehicle.

In the present embodiment, based on the driving video acquired in step 301, the electronic device may analyze the driving video to determine the driving type of the driver and the driving type of the vehicle.

In the present embodiment, the driving video generally includes a continuous driving video recorded with the driving process of the driver. Here, the electronic device may first intercept the driving video recorded with the driving process of the driver from the driving video, then input the driving video into a pre-trained driving type recognition model to obtain the driving type of the driver. Here, the driving type may include, but is not limited to, normal driving type, fatigue driving type, dialing and answering hand-held phone driving type, viewing television driving type, and the like. The driving type recognition model may be composed of a Convolutional Neural Network, a Recurrent Neural Network, and a Fully Connected Layer, and the driving type is for characterizing the correspondence relationship between the driving video and the driving type.

In the present embodiment, the electronic device may first analyze the driving video to acquire the road driving condition and the driving state of the vehicle to generate driving information of the vehicle, and then determine the driving type of the vehicle based on the driving information of the vehicle. The road driving condition of the vehicle may include, but is not limited to, a driving lane of the vehicle, an indication state of the traffic signal in the driving process of the vehicle, and a speed indicated on the speed limit sign on the driving lane of the vehicle, and the like. The driving state of the vehicle may include, but is not limited to, a driving direction of the vehicle, a driving speed of the vehicle, a driving trajectory of the vehicle, and the like. Here, the electronic device may analyze the driving information of the vehicle to determine that the driving information of the vehicle satisfies the driving condition corresponding to a driving type, and if the driving information of the vehicle satisfies the driving condition corresponding to a certain driving type, the certain driving type is the driving type of the vehicle. Here, the driving type may include, but is not limited to, a normal driving type, a traffic light violation driving type, a converse driving type, an overspeed driving type, a cross-line driving type, and the like. For example, if the driving information of the vehicle satisfies the driving condition corresponding to the traffic light violation driving type, the driving type of the vehicle is the traffic light violation driving type.

Step 307, determining, based on the driving type of the driver and the driving type of the vehicle, a responsibility level of the driver in a traffic accident occurred within the preset time period.

In the present embodiment, based on the driving type of the driver and the driving type of the vehicle determined in step 306, the electronic device may determine the responsibility level of the driver in the traffic accident occurred within the preset time period. The preset time period may be the time period within which a traffic accident occurs. The responsibility level may be set in advance as needed. For example, the responsibility level may include all responsibility level, primary responsibility level, secondary responsibility level, and no responsibility level. Different responsibility levels correspond to different responsibility score sections. Different driving types of the driver and different driving types of the vehicle correspond to different responsibility scores and weights respectively. Here, the electronic device may first acquire the responsibility score and weight corresponding to the driving type of the vehicle, and acquire the responsibility score and weight corresponding to the driving type of the driver; and then weighted sum them to calculate the responsibility score of the driver in this traffic accident; finally, the responsibility score of the driver in the traffic accident falls within a certain responsibility score section corresponding to the responsibility type, and the responsibility level of the driver in the traffic accident is the responsibility level corresponding to the certain responsibility score section.

Step 308, outputting the responsibility level of the driver in the traffic accident occurred within the preset time period.

In the present embodiment, based on the responsibility level determined in step 307, the electronic device may output the responsibility level of the driver in the traffic accident occurred within the preset time period. For example, the electronic device may output the responsibility level of the driver in the traffic accident occurred within the preset time period to the terminal device communicatively connected thereto, so that the responsibility level of the driver in the traffic accident occurred within the preset time period is displayed on the screen of the terminal device or the responsibility level of the driver in the traffic accident occurred within the preset time period is played by the audio playback device of the terminal device. The identity information of the driver may also be output to the memory of the electronic device for storage.

As may be seen from FIG. 3, compared with the embodiment in FIG. 2, the flow 300 of the method for outputting information in the present embodiment adds the step of determining the responsibility level. Thus, the solution described in this embodiment can quickly determine the responsibility level of the driver in a traffic accident.

Figure 4:
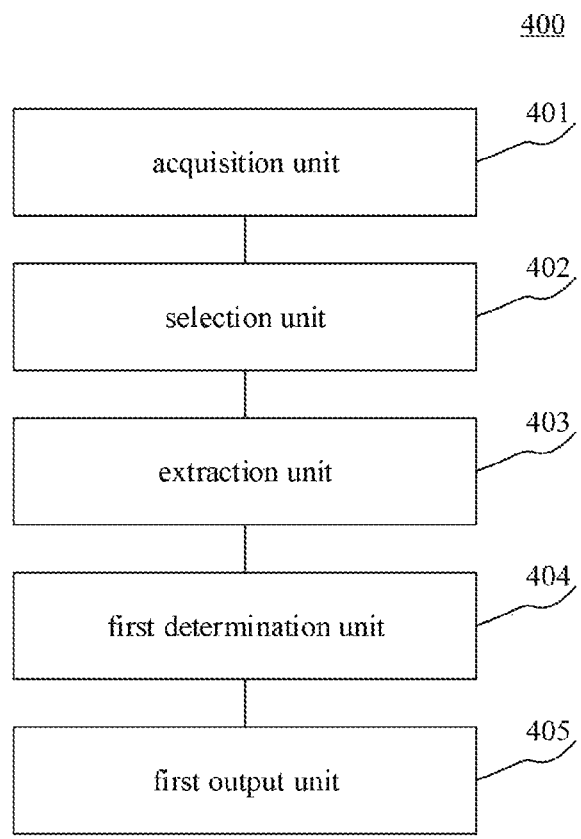
FIG. 4 is a schematic structural diagram an apparatus for outputting information according to of an embodiment of the present disclosure.

With further reference to FIG. 4, as an implementation to the method shown in the above figures, the present disclosure provides an embodiment of an apparatus for outputting information. The apparatus embodiment corresponds to the method embodiment shown in FIG. 2, and the apparatus may specifically be applied to various electronic devices.

As shown in FIG. 4, the apparatus 400 for outputting information of the present embodiment may include: an acquisition unit 401, a selection unit 402, an extraction unit 403, a first determination unit 404 and a first output unit 405. The acquisition unit 401 is configured to acquire a driving video of a driving process of a vehicle shot within a preset time period, the driving video including at least one frame of driving image. The selection unit 402 is configured to select, from the driving video, a driving image including a face image area of a driver. The extraction unit 403 is configured to extract a facial feature of the driver from the driving image including the face image area of the driver. The first determination unit 404 is configured to determine identity information of the driver based on the facial feature of the driver. The first output unit 405 is configured to output the identity information of the driver.

In the present embodiment, in the apparatus 500 for outputting information, the specific processing and the technical effects thereof of the acquisition unit 401, the selection unit 402, the extraction unit 403, the first determination unit 404, and the first output unit 405 may be referred to the related descriptions of step 201, step 202, step 203, step 204, and step 205 in the corresponding embodiment of FIG. 2, and detailed description thereof will be omitted.

In some alternative implementations of the present embodiment, the extraction unit 403 may include: a generation subunit (not shown in the figure), configured to generate an image matrix of the driving image including the face image area of the driver, wherein a row of the image matrix corresponds to a height of the face image, a column of the image matrix corresponds to a width of the face image, and an element of the image matrix corresponds to a pixel of the face image; and an extraction subunit (not shown in the figure), configured to input the image matrix of the driving image including the face image area of the driver into a pre-trained convolutional neural network to obtain the facial feature of the driver, wherein the convolutional neural network is used to extract a facial feature.

In some alternative implementations of the present embodiment, the first determination unit 404 may include: a selection subunit (not shown in the figure), configured to select a driving image including a license plate number image area from the driving video; an analyzing subunit (not shown in the figure), configured to perform an image analysis on the driving image including the license plate number image area to obtain the license plate number of the vehicle; a first matching subunit (not shown in the figure), configured to match the facial feature of the driver and the license plate number of the vehicle in a pre-acquired vehicle-related information set, wherein vehicle-related information in the vehicle-related information set includes the license plate number of the vehicle, a face image of an owner of the vehicle, and identity information of the owner of the vehicle; and a first determination subunit (not shown in the figure), configured to acquire identity information of the driver in the successfully matched vehicle-related information as the identity information of the driver, if the matching is successful.

In some alternative implementations of the present embodiment, the first determination unit 404 may include: a second matching subunit (not shown in the figure), configured to match the facial feature of the driver in a pre-stored facial feature set, wherein a facial feature in the facial feature set corresponds to identity information; and a second determination subunit (not shown in the figure), configured to acquire identity information corresponding to the successfully matched facial feature as the identity information of the driver, if the matching is successful.

In some alternative implementations of the present embodiment, the apparatus 800 for outputting information may further include: a second determination unit (not shown in the figure), configured to analyze the driving video to determine a driving type of the driver and a driving type of the vehicle; a third determination unit (not shown in the figure), configured to determine, based on the driving type of the driver and the driving type of the vehicle, a responsibility level of the driver in a traffic accident occurred within the preset time period; and a second output unit (not shown in the figure), configured to output the responsibility level of the driver in the traffic accident occurred within the preset time period.

Figure 5:
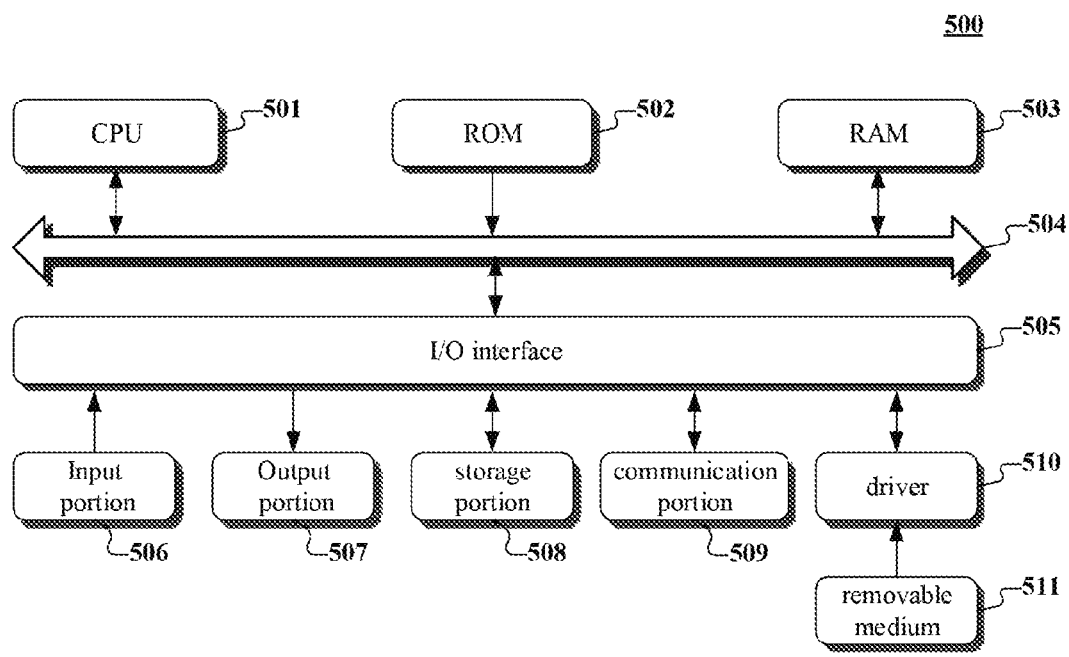
FIG. 5 is a schematic structural diagram of a computer system adapted to implement an electronic device of the embodiments of the present disclosure.

Referring to FIG. 5, a schematic structural diagram of a computer system 500 adapted to implement the electronic device of the embodiments of the present disclosure is shown. The electronic device shown in FIG. 5 is merely an example and should bring no limitation on the function and usage range of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an acquisition unit, a selection unit, an extraction unit, a first determination unit and a first outputting unit, where the names of these units or modules do not in some cases constitute a limitation to such units or modules themselves. For example, the acquisition unit may also be described as "a unit for acquiring a driving video of a driving process of a vehicle shot within a preset time period."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a driving video of a driving process of a vehicle shot within a preset time period, the driving video comprising at least one frame of driving image; select, from the driving video, a driving image comprising a face image area of a driver; extract a facial feature of the driver from the driving image comprising the face image area of the driver; determine identity information of the driver based on the facial feature of the driver; and output the identity information of the driver.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A computer-implemented method for outputting information, the method comprising:
    acquiring a driving video of a driving process of a vehicle shot within a preset time period, the driving video comprising at least one frame of driving image;
    selecting, from the driving video, a driving image comprising a face image area of a driver;
    extracting a facial feature of the driver from the driving image comprising the face image area of the driver;
    determining identity information of the driver based on the facial feature of the driver;
    outputting the identity information of the driver;
    analyzing the driving video to determine a driving type of the driver and a driving type of the vehicle, wherein the driving type of the driver comprises at least one of a normal driving type, a fatigue driving type, a dialing and answering hand-held phone driving type, or a viewing television driving type, and the driving type of the vehicle comprises at least one of a normal driving type, a traffic light violation driving type, a converse driving type, an overspeed driving type, or a cross-line driving type;
    determining, based on the driving type of the driver and the driving type of the vehicle, a responsibility level of the driver in a traffic accident occurred within the preset time period, comprising:
        acquiring a responsibility score and a weight corresponding to the driving type of the vehicle;
        acquiring a responsibility score and a weight corresponding to the driving type of the driver;

calculating a responsibility score of the driver in the traffic accident, by weighted summing the responsibility score corresponding to the driving type of the vehicle and the responsibility score corresponding to the driving type of the driver; and determining a responsibility type corresponding to a responsibility score section, the calculated responsibility score of the driver in the traffic accident being located in the responsibility score section, as the responsibility level of the driver in the traffic accident; and outputting the responsibility level of the driver in the traffic accident occurred within the preset time period.

2. The method according to claim 1, wherein the extracting a facial feature of the driver from the driving image comprising the face image area of the driver comprises:

generating an image matrix of the driving image comprising the face image area of the driver, wherein a row of the image matrix corresponds to a height of the face image, a column of the image matrix corresponds to a width of the face image, and an element of the image matrix corresponds to a pixel of the face image; and inputting the image matrix of the driving image comprising the face image area of the driver into a pre-trained convolutional neural network to obtain the facial feature of the driver, wherein the convolutional neural network is used to extract a facial feature.

3. The method according to claim 1, wherein the determining identity information of the driver based on the facial feature of the driver comprises:

selecting a driving image comprising a license plate number image area from the driving video;

performing an image analysis on the driving image comprising the license plate number image area to obtain the license plate number of the vehicle;

matching the facial feature of the driver and the license plate number of the vehicle in a pre-acquired vehicle-related information set, wherein vehicle-related information in the vehicle-related information set comprises the license plate number of the vehicle, a face image of an owner of the vehicle, and identity information of the owner of the vehicle; and acquiring identity information of the driver in the successfully matched vehicle-related information as the identity information of the driver, if the matching is successful.

4. The method according to claim 1, wherein the determining identity information of the driver based on the facial feature of the driver comprises:

matching the facial feature of the driver in a pre-stored facial feature set, wherein a facial feature in the facial feature set corresponds to identity information; and acquiring identity information corresponding to the successfully matched facial feature as the identity information of the driver, if the matching is successful.

5. The method according to claim 1, wherein the driving type of the driver is determined by a pre-trained driving type recognition model with a segment of the driving video recording a driving process of the driver as an input of the pre-trained driving type recognition model, and the pre-trained driving type recognition model is composed of a convolutional neural network, a recurrent neural network, and a fully connected layer.

6. An apparatus for outputting information, the apparatus comprising:

at least one processor; and a memory storing instructions, the instructions when executed by the at least one processor, cause the at least one processor to perform operations, the operations comprising:

acquiring a driving video of a driving process of a vehicle shot within a preset time period, the driving video comprising at least one frame of driving image;

selecting, from the driving video, a driving image comprising a face image area of a driver;

extracting a facial feature of the driver from the driving image comprising the face image area of the driver;

determining identity information of the driver based on the facial feature of the driver;

outputting the identity information of the driver;

analyzing the driving video to determine a driving type of the driver and a driving type of the vehicle, wherein the driving type of the driver comprises at least one of a normal driving type, a fatigue driving type, a dialing and answering hand-held phone driving type, or a viewing television driving type, and the driving type of the vehicle comprises at least one of a normal driving type, a traffic light violation driving type, a converse driving type, an overspeed driving type, or a cross-line driving type;

determining, based on the driving type of the driver and the driving type of the vehicle, a responsibility level of the driver in a traffic accident occurred within the preset time period, comprising:

acquiring a responsibility score and a weight corresponding to the driving type of the vehicle;

acquiring a responsibility score and a weight corresponding to the driving type of the driver;

calculating a responsibility score of the driver in the traffic accident, by weighted summing the responsibility score corresponding to the driving type of the vehicle and the responsibility score corresponding to the driving type of the driver; and determining a responsibility type corresponding to a responsibility score section, the calculated responsibility score of the driver in the traffic accident being located in the responsibility score section, as the responsibility level of the driver in the traffic accident; and outputting the responsibility level of the driver in the traffic accident occurred within the preset time period.

7. The apparatus according to claim 6, wherein the extracting a facial feature of the driver from the driving image comprising the face image area of the driver comprises:

generating an image matrix of the driving image comprising the face image area of the driver, wherein a row of the image matrix corresponds to a height of the face image, a column of the image matrix corresponds to a width of the face image, and an element of the image matrix corresponds to a pixel of the face image; and inputting the image matrix of the driving image comprising the face image area of the driver into a pre-trained convolutional neural network to obtain the facial feature of the driver, wherein the convolutional neural network is used to extract a facial feature.

8. The apparatus according to claim 6, wherein the determining identity information of the driver based on the facial feature of the driver comprises:

selecting a driving image comprising a license plate number image area from the driving video;

performing an image analysis on the driving image comprising the license plate number image area to obtain the license plate number of the vehicle;

matching the facial feature of the driver and the license plate number of the vehicle in a pre-acquired vehicle-related information set, wherein vehicle-related information in the vehicle-related information set comprises the license plate number of the vehicle, a face image of an owner of the vehicle, and identity information of the owner of the vehicle; and acquiring identity information of the driver in the successfully matched vehicle-related information as the identity information of the driver, if the matching is successful.

9. The apparatus according to claim 6, wherein the determining identity information of the driver based on the facial feature of the driver comprises:

matching the facial feature of the driver in a pre-stored facial feature set, wherein a facial feature in the facial feature set corresponds to identity information; and acquiring identity information corresponding to the successfully matched facial feature as the identity information of the driver, if the matching is successful.

10. A non-transitory computer readable storage medium storing a computer program, wherein the computer program, when executed by a processor, cause the processor to perform operations, the operation comprising:

acquiring a driving video of a driving process of a vehicle shot within a preset time period, the driving video comprising at least one frame of driving image;

selecting, from the driving video, a driving image comprising a face image area of a driver;

extracting a facial feature of the driver from the driving image comprising the face image area of the driver;

determining identity information of the driver based on the facial feature of the driver;

outputting the identity information of the driver;

analyzing the driving video to determine a driving type of the driver and a driving type of the vehicle, wherein the driving type of the driver comprises at least one of a normal driving type, a fatigue driving type, a dialing and answering hand-held phone driving type, or a viewing television driving type, and the driving type of the vehicle comprises at least one of a normal driving type, a traffic light violation driving type, a converse driving type, an overspeed driving type, or a cross-line driving type;

determining, based on the driving type of the driver and the driving type of the vehicle, a responsibility level of the driver in a traffic accident occurred within the preset time period, comprising:

acquiring a responsibility score and a weight corresponding to the driving type of the vehicle;

acquiring a responsibility score and a weight corresponding to the driving type of the driver;

calculating a responsibility score of the driver in the traffic accident, by weighted summing the responsibility score corresponding to the driving type of the vehicle and the responsibility score corresponding to the driving type of the driver; and determining a responsibility type corresponding to a responsibility score section, the calculated responsibility score of the driver in the traffic accident being located in the responsibility score section, as the responsibility level of the driver in the traffic accident; and outputting the responsibility level of the driver in the traffic accident occurred within the preset time period.

* * * * *